US012370707B2

(12) United States Patent
Blatter et al.

(10) Patent No.: US 12,370,707 B2
(45) Date of Patent: Jul. 29, 2025

(54) RAZOR CARTRIDGE

(71) Applicant: Edgewell Personal Care Brands, LLC, Chesterfield, MO (US)

(72) Inventors: Alan Blatter, Newtown, CT (US); Christopher Fernald, Fairfield, CT (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 153 days.

(21) Appl. No.: 17/154,013

(22) Filed: Jan. 21, 2021

(65) Prior Publication Data

US 2021/0245378 A1 Aug. 12, 2021

Related U.S. Application Data

(60) Provisional application No. 62/975,226, filed on Feb. 12, 2020.

(51) Int. Cl.
*B26B 21/40* (2006.01)
*B26B 21/22* (2006.01)
*B26B 21/56* (2006.01)

(52) U.S. Cl.
CPC ........ *B26B 21/4012* (2013.01); *B26B 21/222* (2013.01); *B26B 21/4031* (2013.01); *B26B 21/565* (2013.01); *B26B 21/4018* (2013.01)

(58) Field of Classification Search
CPC ......... B26B 21/14; B26B 21/16; B26B 21/22; B26B 21/222; B26B 21/225; B26B 21/40;
(Continued)

(56) References Cited

U.S. PATENT DOCUMENTS 2,505,493 A 4/1950 Herrmann
3,137,940 A 6/1964 Curci
(Continued)

FOREIGN PATENT DOCUMENTS

EP 2537648 A1 12/2012
EP 3292964 A1 3/2018
(Continued)

OTHER PUBLICATIONS

Search Report issued from EP Application No. 20160477.4 dated Sep. 11, 2020.
(Continued)

*Primary Examiner* — Jason Daniel Prone
(74) *Attorney, Agent, or Firm* — Edgar Rodriguez

(57) ABSTRACT

A razor cartridge has an elongated housing with a guard having spaced-apart ribs; a cap at a respective front and rear region of the housing; and a partition extending between and integrally formed with opposed lateral side walls of the housing. A first razor blade is mounted in a first blade mounting region between the guard and the partition. A second razor blade adjacent the partition, and a third razor blade are mounted in a second blade mounting region between the partition and the cap. A first span between the cutting edge of the first razor blade and the cutting edge of the second razor blade is at least 3.0 mm up to 5.12 mm. Pivotal connecting structure of the housing defines a pivot axis in a region between the cutting edges of the first and second razor blades.

19 Claims, 8 Drawing Sheets

(58) Field of Classification Search
CPC ............ B26B 21/4012; B26B 21/4018; B26B 21/4025; B26B 21/4031; B26B 21/443
USPC .......................................... 30/47–51; D28/47
See application file for complete search history.

(56) References Cited

U.S. PATENT DOCUMENTS 4,146,958 A * 4/1979 Chen ................... B26B 21/4018 30/47
4,272,885 A 6/1981 Ferraro
4,831,731 A 5/1989 Elits
5,369,885 A 12/1994 Ferraro
5,412,872 A * 5/1995 Iderosa ............... B26B 21/4018 30/50
5,416,974 A 5/1995 Wain
5,426,851 A 6/1995 Gilder et al.
5,546,660 A 8/1996 Burout et al.
5,802,721 A 9/1998 Wain et al.
5,953,819 A * 9/1999 Simms ................ B26B 21/4018 30/77
6,161,288 A * 12/2000 Andrews ............... B26B 21/222 30/50
6,212,777 B1 4/2001 Gilder et al.
6,243,951 B1 6/2001 Oldroyd
6,305,084 B1 10/2001 Zucker
6,378,211 B1 4/2002 McCool et al.
6,397,473 B1 6/2002 Clark
6,473,970 B1 11/2002 Prochaska
7,111,401 B2 9/2006 Richard
D633,254 S * 2/2011 Witkus ........................... D28/47
D653,395 S * 1/2012 Adams ................ B26B 21/4018 D28/47
D658,809 S * 5/2012 Jessemey ............ B26B 21/4018 D28/47
8,209,867 B2 * 7/2012 Clarke ................ B26B 21/4018 30/51
D665,948 S * 8/2012 Jessemey ............ B26B 21/4012 D28/47
8,413,334 B2 * 4/2013 Walker, Jr. .......... B26B 21/4031 30/50
9,259,846 B1 2/2016 Robertson
9,415,522 B2 8/2016 Oglesby et al.
9,492,933 B2 * 11/2016 Wain ................... B26B 21/4018
10,562,198 B2 2/2020 Clarke et al.
10,773,401 B2 9/2020 Walker, Jr. et al.
10,773,402 B2 9/2020 Walker, Jr. et al.
10,773,404 B2 * 9/2020 O'Connor ........... B26B 21/4012
D905,908 S * 12/2020 Washington ........ B26B 21/4018 D28/47
11,117,278 B2 * 9/2021 Walker, Jr. .......... B26B 21/4012
D940,394 S * 1/2022 Fyfield .................... B26B 21/22 D28/47
D947,451 S * 3/2022 Fernald .......................... D28/47
D948,122 S * 4/2022 Fernald .......................... D28/47
11,345,055 B2 * 5/2022 Long ................... B26B 21/4018
D1,062,061 S * 2/2025 Ovvadias ....................... D28/47
2005/0198837 A1 9/2005 Rawle
2006/0064875 A1 3/2006 Follo et al.
2006/0277759 A1 12/2006 Follo
2010/0058595 A1 * 3/2010 Walker, Jr. .......... B26B 21/4031 30/77
2010/0077619 A1 4/2010 Follo et al.
2010/0107416 A1 5/2010 Follo
2011/0094108 A1 * 4/2011 Wain ................... B26B 21/4018 30/77
2011/0146079 A1 * 6/2011 Clarke ................ B26B 21/4012 30/34.05
2012/0192431 A9 * 8/2012 Wain ................... B26B 21/4018 30/50
2012/0317818 A1 * 12/2012 Oglesby .............. B26B 21/4018 30/77
2012/0324737 A1 * 12/2012 Howell ............... B26B 21/4018 30/50
2014/0259677 A1 9/2014 Coresh
2016/0158948 A1 * 6/2016 Eagleton ............. B26B 21/4018 30/34.2
2017/0282388 A1 * 10/2017 Haines ................ B26B 21/4018
2017/0282389 A1 * 10/2017 Jolley ................. B26B 21/4018
2018/0071929 A1 3/2018 Walker, Jr. et al.
2018/0345511 A1 12/2018 Clarke et al.
2018/0345512 A1 * 12/2018 Walker, Jr. .......... B26B 21/4012
2019/0224874 A1 * 7/2019 Blatter ................ B26B 21/4031
2019/0270211 A1 * 9/2019 Harris, II ............ B26B 21/4012
2020/0031006 A1 1/2020 Kim et al.
2020/0398449 A1 12/2020 Claus et al.
2021/0016458 A1 * 1/2021 Peterson ............. B26B 21/4018
2021/0339413 A1 * 11/2021 Ren ..................... B26B 21/4018
2022/0371211 A1 * 11/2022 Seferi ................. B26B 21/4012
2025/0050521 A1 * 2/2025 Loughlin ............ B26B 21/4012

FOREIGN PATENT DOCUMENTS

JP 06047174 A 2/1994
JP 06126046 A 5/1994
JP 5719755 B2 * 5/2015 ......... B26B 21/4012
KR 101424320 B1 * 8/2014 ......... B26B 21/4018
KR 101465872 B1 * 11/2014 ......... B26B 21/4018
WO 1995029043 A1 11/1995
WO 9604111 A1 2/1996
WO WO-2013154287 A1 * 10/2013 ......... B26B 21/4018
WO 2018052802 A1 3/2018

OTHER PUBLICATIONS

Mckibben, Gordon, "Cutting Edge", Harvard Business School Press, Boston, MA, 1998, pp. 67-69.
Extended European Search Report issued on Apr. 9, 2024 in European Patent Application No. 23211496.7.

* cited by examiner

RAZOR CARTRIDGE

BACKGROUND

1. Technical Field

The present disclosure relates to safety razors in general and, more particularly, to razor cartridges configured to efficiently shave moderately hirsute surfaces.

2. Background

Many modern so-called safety razors include a disposable razor cartridge (cartridge) adapted to be selectively connected to a reusable handle by connecting structure therebetween. When the cartridge is perceived by a user to have reached the end of its useful life it can be selectively ejected from the handle to be replaced by a new cartridge. Other so-called disposable razors are disposed of as an entire unit of a handle with connected cartridge.

Amongst users, there is a sub-set of shavers who will allow their beard stubble to grow for an extended period (e.g. seven days) to a moderate length, then perform a close shave operation, and repeat the cycle.

In "Cutting Edge" by Gordon Mckibben (pub. Harvard Business School Press, 1998, pp 67-69) discovery of an hysteresis effect is described. A second, closely following blade can cut a hair extended from a follicle by a first blade before the hair retracts into the follicle, providing a closer shave, as the hair is effectively cut to a level below the skin surface. As a result, multi-blade cartridges intended for daily shaving have a spacing between adjacent blades typically in ranges 0.95-1.15 mm for a 5-blade cartridge or 1.0-2.0 mm for a 3-blade cartridge (e.g. U.S. patent application publication number 2005/0198837 and U.S. Pat. No. 6,212,777 respectively).

Research by the present applicants finds an average daily growth rate of male beard hair to be about 0.4 mm/day depending upon additional environmental and endogenous factors, such as hair pigmentation. By simple calculation, a seven-day growth beard hair can be about 2.8 mm long. This presents at least two problems. Firstly, there is a tendency for cut hairs and other debris to clog spaces between and adjacent closely spaced blades (e.g. spaced as described above) resulting a loss of efficiency of the cartridge. Secondly, and while not wishing to be bound by theory, the present applicants believe there is a tendency for longer beard hairs to lay on the skin surface during a shaving stroke. Closely spaced blades can both engage the same hair simultaneously. This can result in increased hair pulling and user discomfort.

A user might solve these issues in an inefficient and undesirable manner by using multiple devices e.g. to cut a longer beard hair in multiple stages to achieve sub-skin level closeness in a comfortable manner.

SUMMARY

The present disclosure has for its objective to substantially alleviate the limitations of the prior art razors or cartridges by providing a single device of a cartridge capable of shaving longer beard hair to desirable closeness at desirable comfort.

A cartridge has an elongated housing with a guard at a front region of the housing, the guard has a plurality of spaced-apart ribs defining guard rib slots between adjacent ribs, a rear region of the housing including a cap, and a side wall at each elongated end region of the housing connecting the front regions and the rear region. A partitioning element or partition extends between and is integrally formed with the side walls and provides a first blade mounting region between the guard and the partition, and a second blade mounting region between the partition and the cap. In other aspects the partition can be connected to the first blade or connected to the second blade. The housing also has pivotal connecting structure defining a pivot axis. A first razor blade is mounted in the first blade mounting region, and a second and a third razor blade are both mounted in the second blade mounting region. All the razor blades have their respective cutting edges extending transversely of the guard ribs. A first span between the cutting edge of the first razor blade and the cutting edge of the second razor blade is at least 3.0 mm. The pivot axis is in a region between the cutting edge of the first razor blade and the cutting edge of the second razor blade. In other aspects, the first span can be greater than 3.5 mm, preferably 3.78 mm. In further aspects, the pivot axis can be within 0.5 mm of a plane tangential to the cutting edges of the first and the second razor blades.

In other aspects of any preceding aspect, the cartridge has a second span between the cutting edge of the second razor blade and the cutting edge of the third razor blade and the second span is in a range 1.0 to 1.5 mm, preferably 1.26 mm.

In other aspects of any preceding aspect, the guard ribs can comprise a non-elastomeric polymeric material, more particularly, the guard ribs can be integrally formed with the housing or can be a separate component part secured, e.g. adhered or snap fitted to the housing.

In further aspects of any preceding aspect, the guard ribs provide guard rib slots between adjacent guard ribs that can define a width of 1.5 mm. The guard ribs extend from a floor and a height dimension of the ribs can increase in a direction from the front region of the housing toward the first razor blade. The guard ribs define a length dimension in a direction from the front region to the rear region of the housing and a magnitude of the guard rib length dimension can be greater than a magnitude of the first span. In further aspects of any preceding aspect, the guard ribs are configured to be perpendicular to the pivot axis.

In further aspects of any preceding aspect, the partition has a plurality of spaced apart partition ribs that define partition rib slots between adjacent partition ribs. The partition ribs can be arranged to extend in a direction parallel to the guard ribs. The partition rib slots can define a width of 0.6 mm.

In further aspects of any preceding aspect, any or each razor blade can have a blade guard mounted to an upper surface of the respective razor blade.

The above features and advantages will be more fully understood with reference to the following detailed description when taken in conjunction with the accompanying drawings.

DETAILED DESCRIPTION

Figure 1:
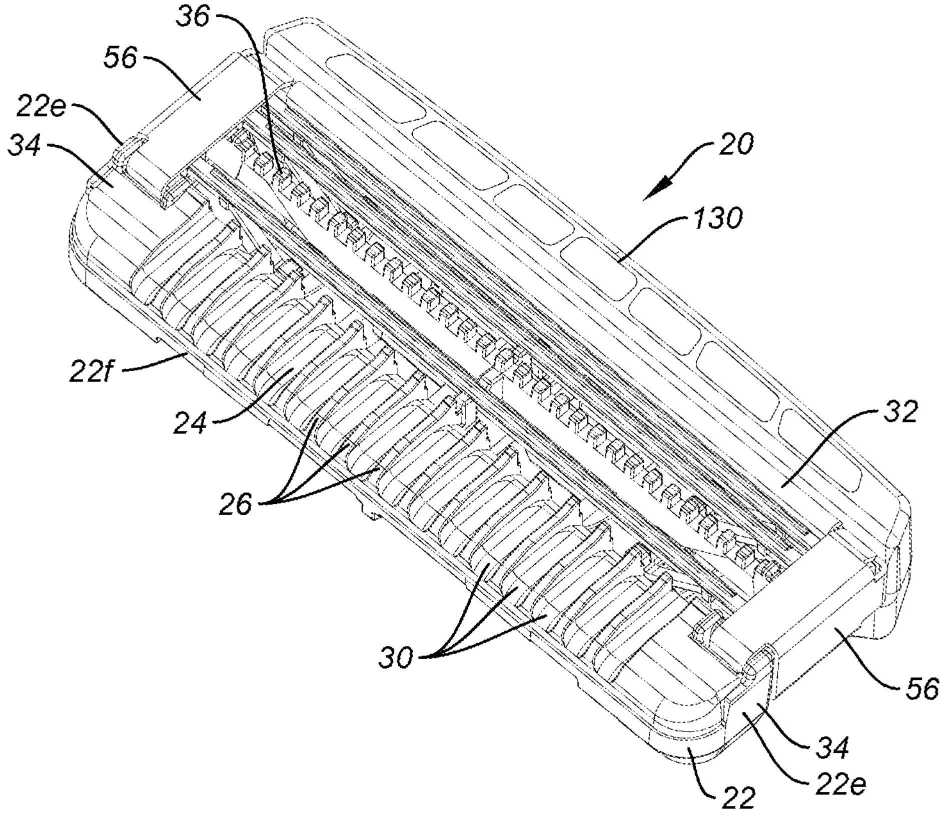
FIG. 1 is an upper isometric view of a razor cartridge of the present disclosure.
Figure 2:
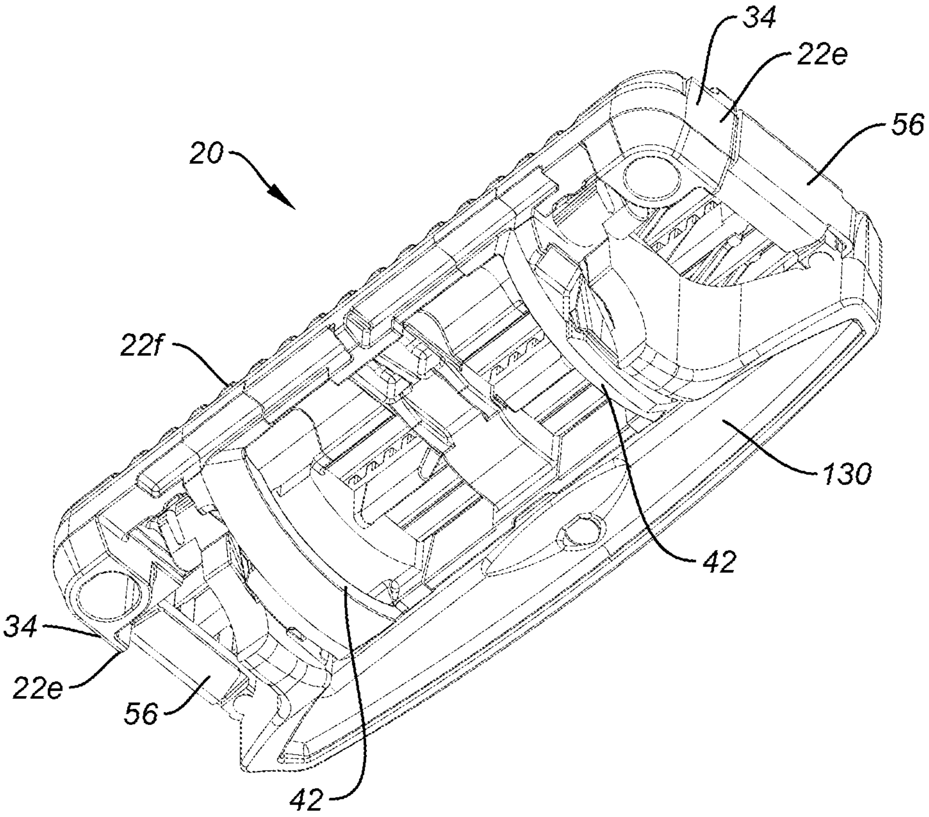
FIG. 2 is a lower isometric view of the cartridge.
Figure 3:
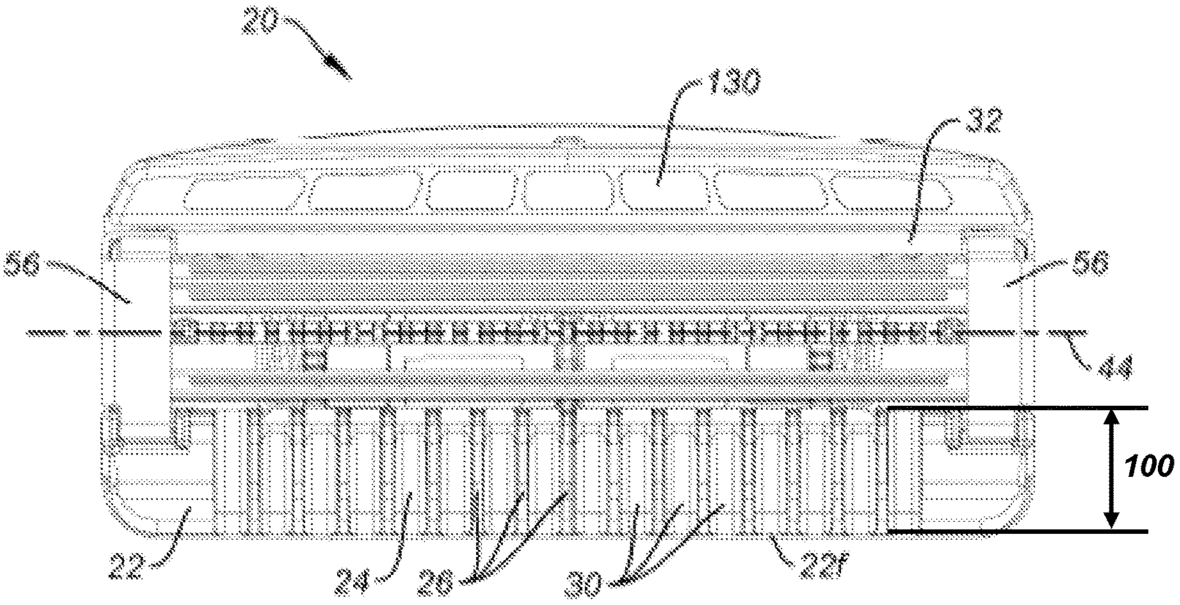
FIG. 3 is a top orthogonal view of the cartridge.
Figure 4:
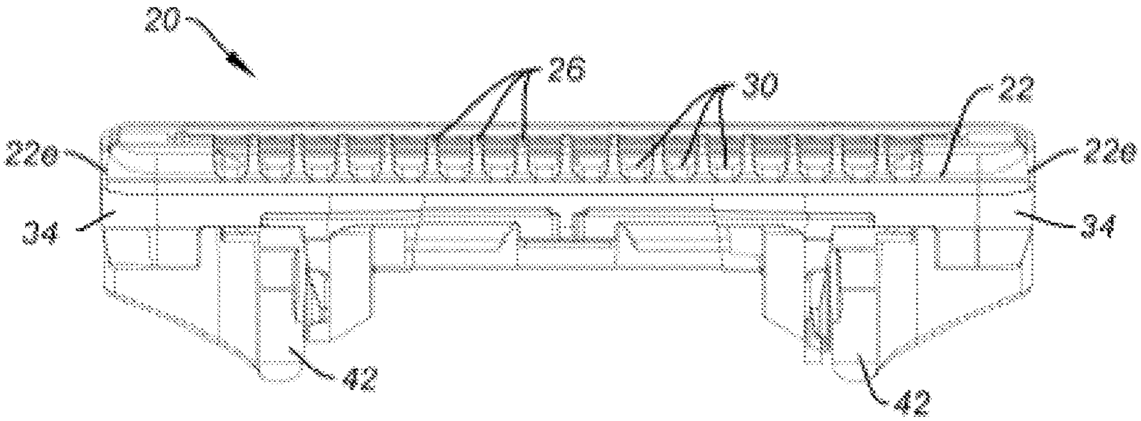
FIG. 4 is a front orthogonal view of the cartridge.
Figure 5:
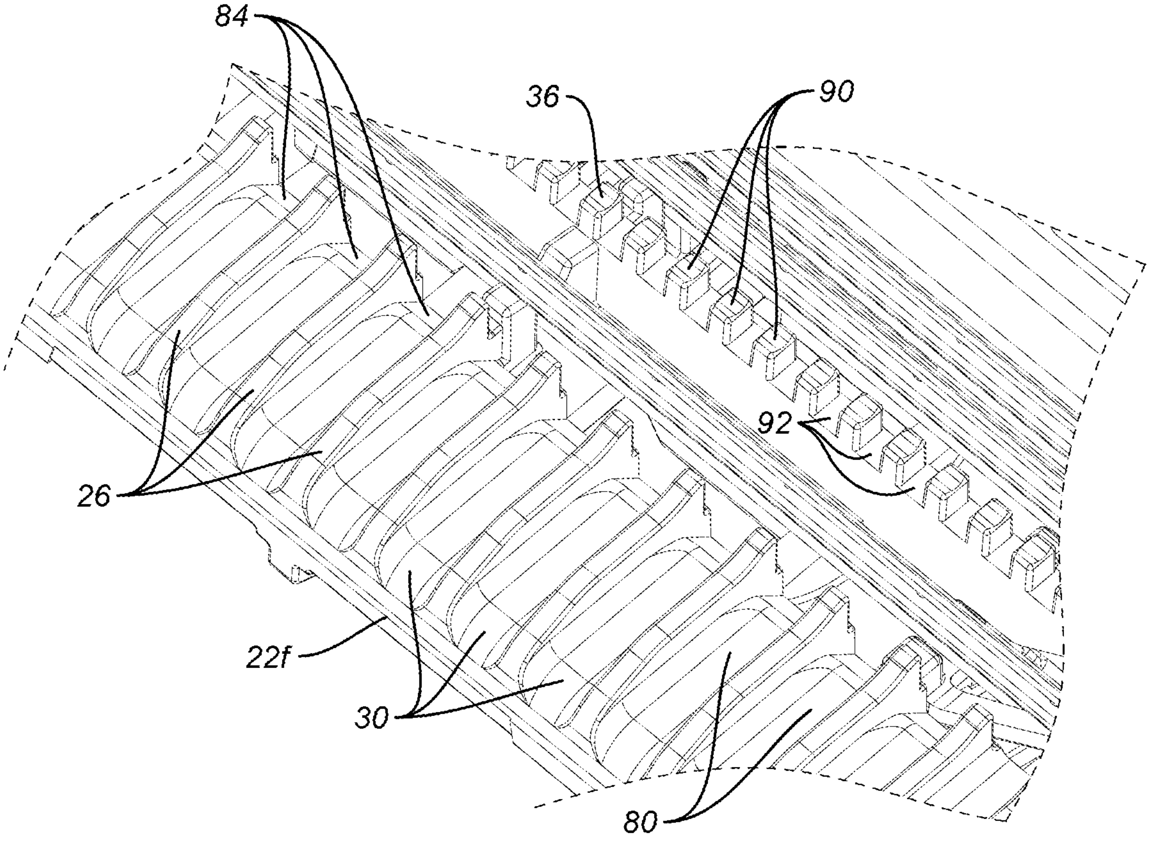
FIG. 5 is a detailed view of a portion of FIG. 1.
Figure 6:
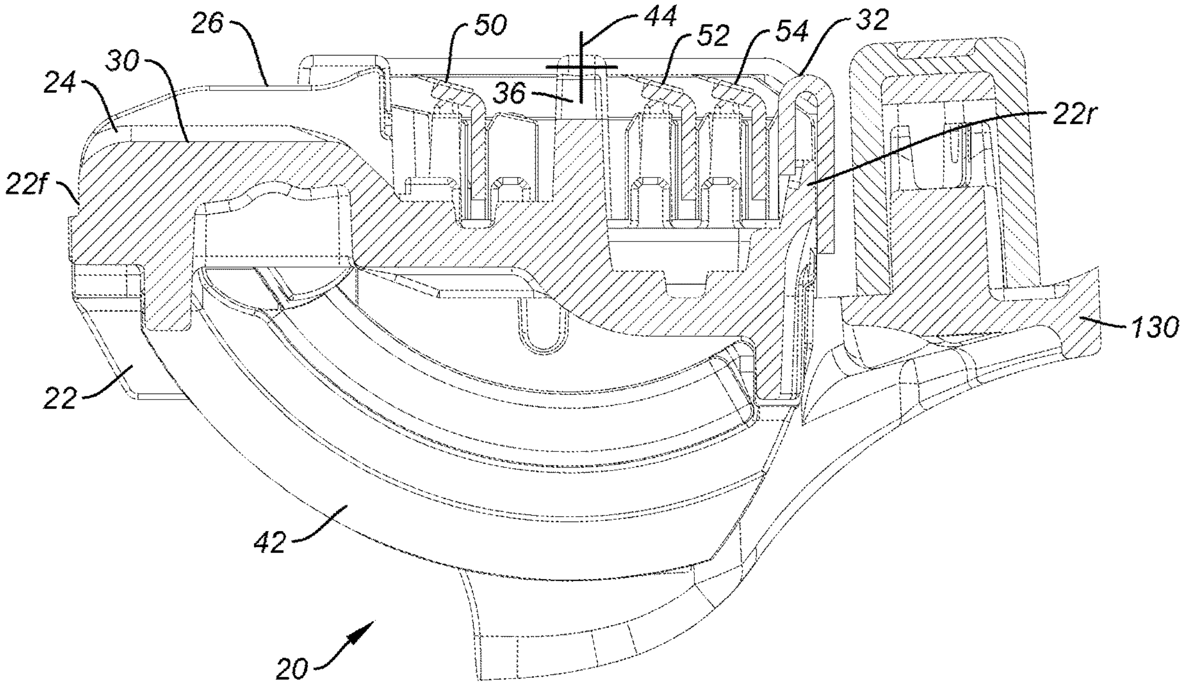
FIG. 6 is a sectional view of the cartridge taken at 6-6 of FIG. 4.
Figure 7:
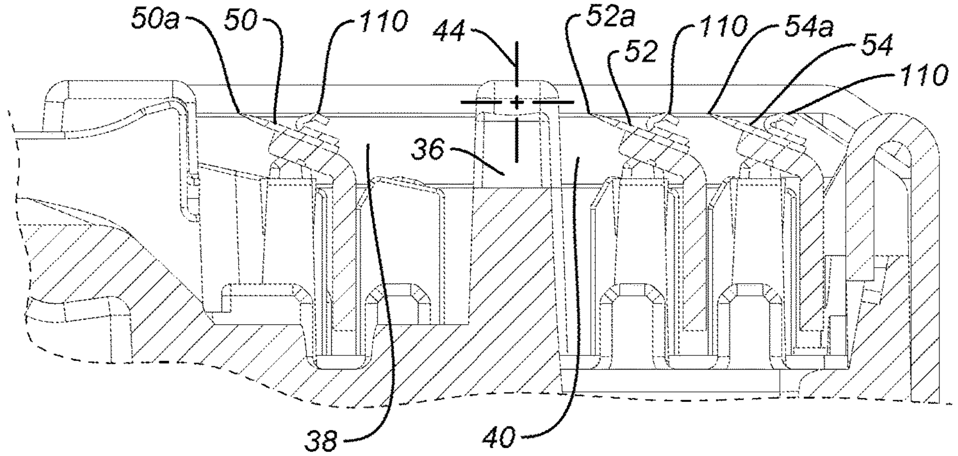
FIG. 7 is a detailed sectional view of another cartridge taken at a region similar to FIG. 6.

Referring now to the drawings, and in particular FIGS. 1 to 10, diverse views of a razor cartridge 20 are shown. The present razor cartridge 20 is intended for unidirectional use, i.e. performing a shaving stroke when drawn in a single direction and consequently its blades' cutting edges face in a common direction. To that end, in the context of the present disclosure, the terms forward, front or leading, and rear, aft or trailing are relative to a direction of motion of the cartridge in use. Although the following description relates to a unidirectional cartridge, the skilled worker will readily understand that the disclosed features can be mirrored to provide a bidirectional device capable of providing the described function when shaving strokes are in opposed directions.

The cartridge 20 comprises a molded (e.g. injection molded) housing 22. The housing 22 has a guard 24 at a front region 22*f* of the housing 22. The guard 24 includes a plurality of spaced-apart ribs 26 defining slots 30 between adjacent ribs 26. A cap 32 is at a rear region 22*r* of the housing 22. The cap 32 can be formed as part of the housing 22 or can be an overlying component part (as depicted) that can e.g. be a portion of blade retaining structure(s) 56. Lateral or side walls 34 are at each elongated end region 22*e* of the housing 22 and connect the front region 22*f* and rear region 22*r*. A partitioning element or partition 36 extends between the side walls 34 and in these figures (i.e. FIGS. 1-11) is integrally formed with the side walls 34. The partition 36 provides a first blade mounting region 38 between the partition 36 and the guard 24, and a second blade mounting region 40 between the partition 36 and the cap 32. Pivotal connecting structure 42, e.g. arcuate bearing structure, is provided to engage mating structure of a suitable handle (not shown but known to the skilled worker) to provide pivotal connection of the cartridge 20 to the handle about a pivot axis 44 (see also FIGS. 6-10) defined by the pivotal connecting structure 42.

The housing 22 is preferably manufactured by injection molding a suitable thermoplastic polymer material. ABS (Acrylonitrile butadiene styrene) is one preferred thermoplastic for benefits such as impact resistance in the event of a user accidentally dropping their device, dimensional stability at molding, and resistance to chemicals found in typical in-use environments. A non-limiting example of a suitable ABS is TERLURAN GP-22, manufactured by INEOS Styrolution. Other thermoplastics such as modified polyphenylene oxide, PPO (e.g. a homogeneous mixture of polyphenylene ether (PPE) and polystyrene PS) can also be used. A non-limiting example of a suitable material is NORYL® PX-5511, manufactured by SABIC Innovative Plastics IP B.V.

A first razor blade 50 is mounted in the first blade mounting region 38. A second razor blade 52, adjacent the partition 36, and a third razor blade 54 are both mounted in the second blade mounting region 40. All of the razor blades 50, 52, 54 are positioned such that their respective cutting edges 50*a*, 52*a*, 54*a* perform a hair-cutting operation when the cartridge 20 is drawn in a forward shaving stroke. All of the razor blades 50, 52, 54 have their cutting edges 50*a*, 52*a*, 54*a* respectively arranged transversely of the guard ribs 26 Any of the razor blades 50, 52, 54 can have a blade guard 110 mounted to an upper surface 112 of the respective razor blade 50, 52, 54. Any of the razor blades 50, 52, 54 can be rigidly mounted in their respective blade mounting region 38, 40, or can be resiliently mounted, e.g. supported on spring fingers. In the context of the present disclosure, a blade guard 110 is structure mounted to any razor blade (50, 52, 54) for the purposes of supporting the skin during use of the cartridge 20, for example, as disclosed in U.S. patent application publication 2006/0277759 incorporated herein for reference in its entirety. The razor blades 50, 52, 54 can be a planar razor blade adjoined to a bent (e.g. generally "L" shaped) support, as for example depicted in the above-mentioned '759 publication. The razor blades 50, 52, 54 can also be a so-called bent razor blade where the blade itself is formed to e.g. an "L" shape and not necessarily joined to a support. The razor blades 50. 52, 54 can be retained in the housing 22 by any suitable means, for example one or more retainers 56 such as that disclosed in U.S. patent application publication 2010/0077619.

While not wishing to be bound by theory, the present applicants believe there is a tendency for longer beard hairs to lay on the skin surface during a shaving stroke. Furthermore, research by the present applicants finds an average daily growth rate of beard hair to be about 0.4 mm/day depending upon additional environmental and endogenous factors, such as hair pigmentation. By simple calculation, a seven-day growth beard hair can be about 2.8 mm long. While further not wishing to be bound by theory, the present applicants believe that multiple cutting edges engaging the same hair simultaneously can result in increased hair pulling and user discomfort. To avoid such discomfort in the present device, a first span dimension 60 (see FIG. 8) between the cutting edge 50*a* of the first razor blade 50 and the cutting edge 52*a* of the forwardmost of the following razor blades (i.e. second razor blade 52) is preferably greater than 3.0 mm, more preferably greater than 3.5 mm, most preferably about 3.78 mm, and in a range up to 5.12 mm.

Figure 8:
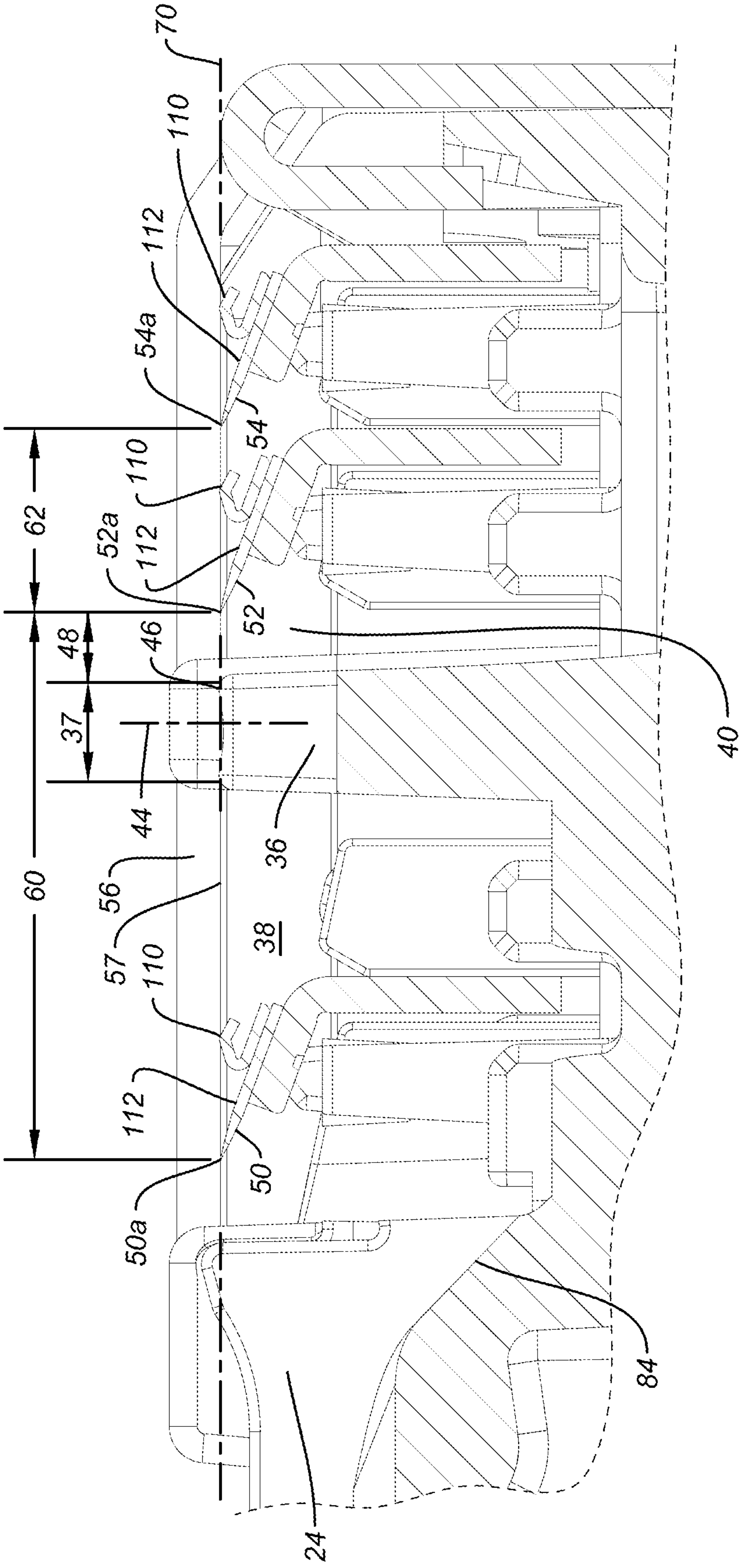
FIG. 8 is an enlarged view of a portion of FIG. 7.

Referring further to FIG. 8, for all the razor blades 50, 52, 54 to function efficiently in their intended use according to this disclosure it is preferable for the cartridge 20 to be "balanced" when pivotally coupled to a handle. That is, forces on the cartridge 20 during use causing moments tending to rotate the cartridge 20 in one direction about its pivot axis 44 relative to the handle are countered by forces causing moments acting in an opposed direction about the pivot axis 44. To that end, the pivot axis 44 is preferably positioned in a region between the cutting edge 50*a* of the first razor blade 50 and the cutting edge 52*a* of the second razor blade 52 in a front to back direction, widthwise of the cartridge 20, and spaced (i.e. within 0.5 mm, within 0.3 mm, within 0.1 mm) from a plane 70 tangential to the cutting edges 50*a*, 52*a* of the first and second razor blades 50, 52. Plane 70 can also be defined by a cutting edge locating under-surface 57 of the retainer 56. More preferably, the pivot axis 44 is widthwise positioned within leader lines representing a width 37 of the partition 36, width 37 being defined at plane 70. Width 37 can preferably be in a range 0.6 mm-0.8 mm.

A second span dimension 62 is between the cutting edge 52*a* of the second razor blade 52 and the cutting edge 54*a* of the sequentially following (i.e. third) razor blade 54. The second span is preferably in a range 1.0-1.5 mm, more preferably about 1.26 mm.

An upper surface 46 of the partition 36 can be coplanar with plane 70. I.e. in instances when upper surface 46 is not flat (e.g. as depicted in FIG. 8), the upper surface 46 is defined by a plane tangential to the partition 36, parallel to plane 70. The upper surface 46 can also be elevated relative to plane 70, e.g. up to about 0.18 mm above plane 70. In the context of the present application, "elevated" is in a direction outwardly of the housing 22. The partition 36 can be positioned to provide a suitable functional span 48 (in the context of providing functional shaving performance of the cutting edge 52*a* of the second razor blade 52) between the partition 36 and the cutting edge 52*a* of the second razor blade 52. Span 48 can be in a range 0.5-1.2 mm.

Figure 10:
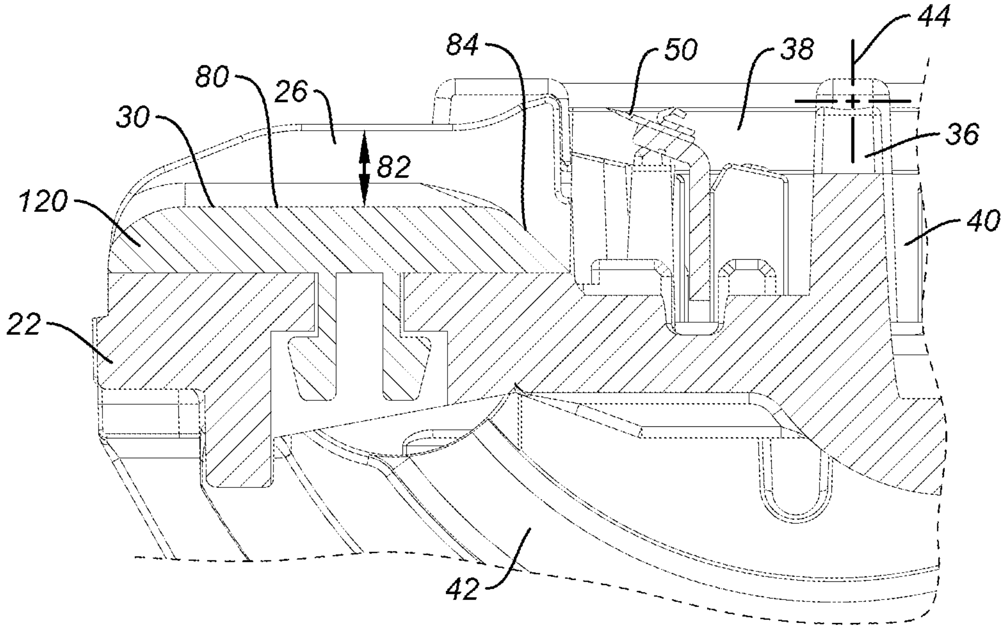
FIG. 10 is a detailed sectional view of a yet further cartridge taken at a region similar to FIG. 6.

The guard ribs 26 provide slots 30 between adjacent ribs 26. The slots 30 align longer beard hairs prior to these impinging the cutting edge 50*a* of the first razor blade 50. The slots preferably have a width in a range 1.0-2.0 mm, e.g. about 1.5 mm. The guard ribs 26 do not necessarily provide any skin or hair traction or skin stimulation and do not necessarily need to be formed from an elastomeric material. The guard ribs 26 can comprise a non-elastomeric material and can be integrally formed with the housing 22. The guard ribs 26 can also be provided on a separate component part 120 (see FIG. 10), suitably secured to the housing 22, e.g. by snap-fitting, as depicted in FIG. 10, or by a suitable adhesive.

As the slots 30 act to align hairs, it is preferable that the guard ribs 26 defining the slots 30 have a guard rib length dimension 100 (in a direction from the front region 22*f* of the housing 22 to the rear region 22*r* of the housing 22), therefore forming a slot 30 length having a magnitude at least equal to, and preferably greater than the magnitude of the first span 60. Preferably the rib length dimension is about 5.4 mm to about 8.6 mm.

The cutting edge 50*a* of the first razor blade 50 is effectively performing a rough cut or preliminary cutting operation to the longer beard hairs. Shaving debris thus created comprises longer hair fragments and should preferably be efficiently removed (rinsed) from the cartridge 20, especially from the region between the guard 24 and the first razor blade 50 to avoid clogging and resultant loss of function. The guard ribs 26 can extend from a floor 80 of the guard 24 and define a height dimension 82 of the ribs 26 to the floor 80. The height dimension 80 preferably increases in a direction from the front region 22*f* of the housing towards the first razor blade 50, and especially in a region closer to the razor blade 50 where the floor 80 has a downwardly angled region 84 to enhance debris rinsing.

Figure 11:
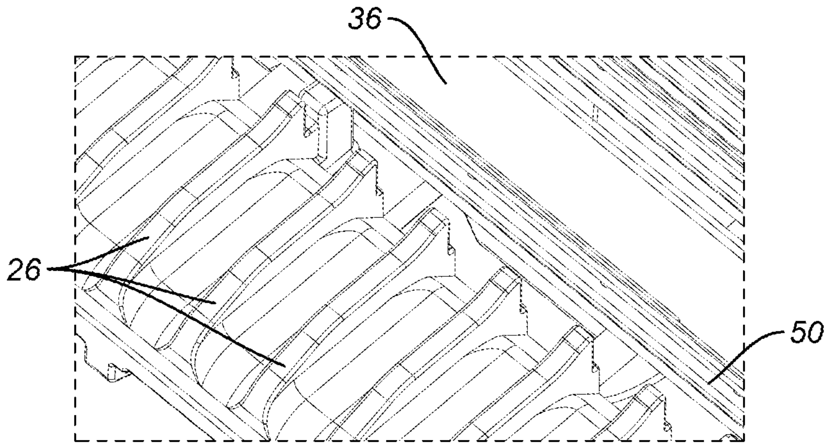
FIG. 11 is another detailed view from the same direction as FIG. 5.

The partition 36 can comprise a plurality of spaced apart partition ribs 90 defining partition slots 92 between adjacent partition ribs 90 and arranged to extend in a direction parallel to the guard ribs 26. The partition slots 92 define a width in a range 0.4-1.0 mm, preferably about 0.6 mm. As shown in FIG. 11, the partition 36 can be uninterrupted along its length, i.e. without partition slots 92. The pitch of the partition slots 92 is preferably about 2.5× the respective slot width.

Figure 12:
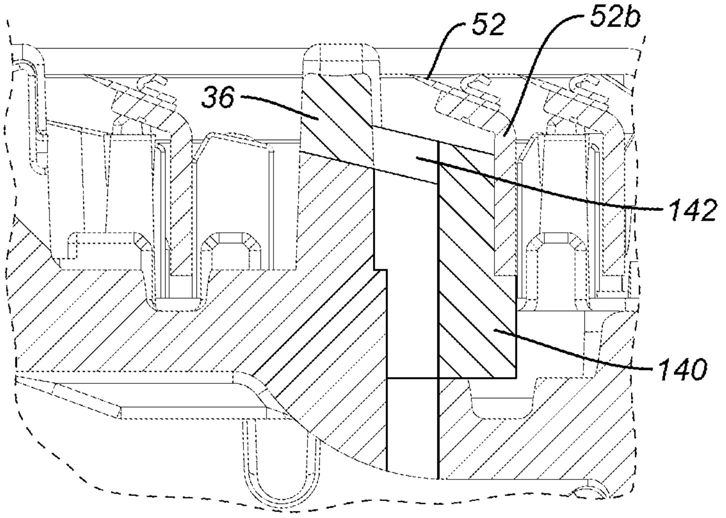
FIG. 12 is another detailed sectional view taken at the same plane as FIG. 7.
Figure 13:
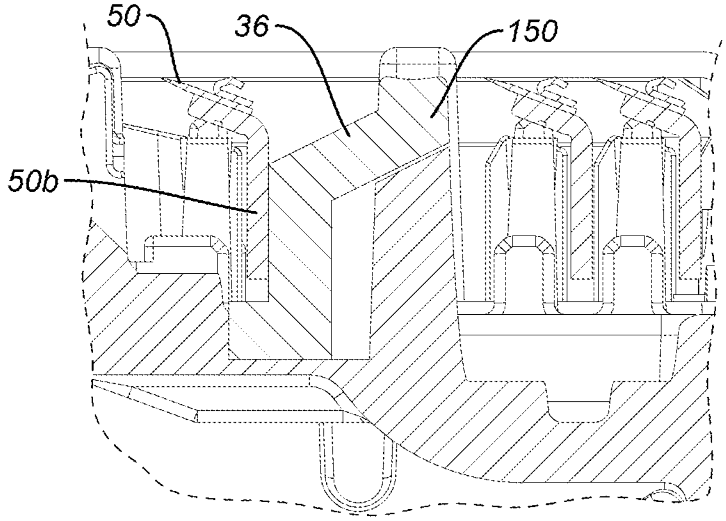
FIG. 13 is a further detailed sectional view taken at the same plane as FIG. 7.

As previously described, the partition 36 extends between the side walls 34 and is integrally formed with the side walls, and therefore the housing 22. In FIG. 12 the partition 36 remains extending between the side walls 34 but is a separate component part 140 connected to the second blade 52. To facilitate the rinsing of shaving debris from the cutting edge 52*a* of the second blade 52, a rinse passage 142 is provided through the separate component part. In FIG. 13 the partition 36 again remains extending between the side walls 34 and is another separate component part 150 connected to the first blade 50. In the context of this disclosure, description of the partition being connected to the first blade 50 or the second blade 52 encompasses being connected to a respective support 50*b*, 52*b* of the first and second blade 50, 52. In the embodiments of FIGS. 12 and 13, either razor blade 50, 52, together with its respectively connected partition 140, 150 can be rigidly mounted in their respective blade mounting region 38, 40, or can be resiliently mounted, e.g. supported on spring fingers.

Figure 9:
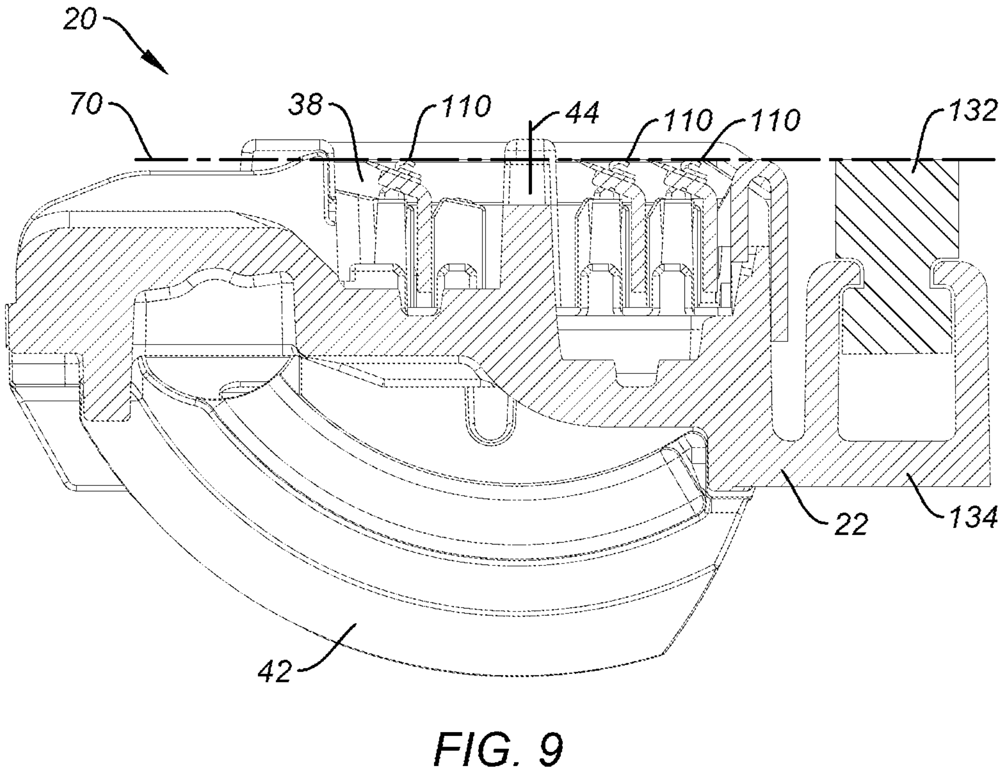
FIG. 9 is a sectional view of a further cartridge taken at a region similar to FIG. 6.

The cartridge can include a lubricating member. As depicted in FIGS. 1-4, the lubricating member can be a separable lubrication 130 as disclosed in U.S. patent application publication 2010/0107416, incorporated herein for reference in its entirety. As depicted in FIG. 9, the lubricating member can be an extruded structure 132, e.g. as known in the art, mounted to a structure 134 fixedly connected to the housing 22.

In a process to assemble the razor cartridge 22, either separate partition component part 140, 150 can be pre-assembled to its respective blade 50, 52 to provide a respective sub-assembly, and this sub-assembly can be assembled to the housing 22. In the alternative, the component parts connected to the housing 22 can be sequentially assembled to the housing 22.

While various embodiments have been described above it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above described exemplary embodiments but should be defined only in accordance with the following claims and their equivalents.

What is claimed is:

1. A razor cartridge, comprising:

an elongated housing having:

- a guard at a front region of the housing, the guard including a plurality of spaced-apart guard ribs defining guard rib slots between adjacent ones of the ribs, the guard ribs extending from a floor of the guard, the guard rib slots extending along the floor;
- a rear region of the housing including a cap;
- a side wall at each elongated end region of the housing connecting the front region and the rear region;
- a pivotal connecting structure defining a pivot axis; and
- a partition extending between and integrally formed with the side walls, and providing a first blade mounting region between the guard and the partition, and a second blade mounting region between the partition and the cap;

a first razor blade mounted in the first blade mounting region; and a second razor blade, adjacent the partition, and a third razor blade are both mounted in the second blade mounting region; all of the razor blades having their respective cutting edges extending transversely of the guard ribs;

a first span between the cutting edge of the first razor blade and the cutting edge of the second razor blade is in a range of 3.0 to 5.12 mm; and the pivot axis in a region between the cutting edge of the first razor blade and the cutting edge of the second razor blade;

wherein the guard ribs extend between the front region of the housing and the rear region;

wherein the guard ribs define a guard rib length dimension between the front region to the rear region of the housing;

wherein the guard rib length dimension for each of the guard ribs is generally equal;

wherein the guard ribs are configured to be perpendicular to the pivot axis;

wherein the guard rib slots define a slot length dimension and wherein the slot length dimension is greater than the first span; and wherein a height dimension of the ribs increases in a direction from the front region of the housing toward the first razor blade, the floor including an angled region extending in a direction opposite to a plane tangential to the cutting edges of the first and the second razor blade, the angled region is close to the first razor blade.

2. The razor cartridge of claim 1, wherein a second span between the cutting edge of the second razor blade and the cutting edge of the third razor blade is in a range of 1.0 to 1.5 mm.

3. The razor cartridge of claim 2, wherein the second span between the cutting edge of the second razor blade and the cutting edge of the third razor blade is 1.26 mm.

4. The razor cartridge of claim 1, wherein the first span is greater than 3.5 mm and less than 5.12 mm.

5. The razor cartridge of claim 4, wherein the first span is 3.78 mm.

6. The razor cartridge of claim 1, wherein an upper surface of the partition is one of coplanar with a plane tangential to the cutting edges of the first and the second razor blade and elevated from the plane in a range up to 0.18 mm.

7. The razor cartridge of claim 6, wherein the upper surface of the partition defines a width in a range 0.6-0.8 mm, defined where the upper surface of the partition is co-planar with the plane tangential to the cutting edges of the first and the second razor blade.

8. The razor cartridge of claim 6, wherein the pivot axis is spaced within a distance 0.5 mm from the plane tangential to the cutting edges of the first and second razor blade.

9. The razor cartridge of claim 1, wherein the guard ribs comprise a non-elastomeric polymeric material.

10. The razor cartridge of claim 1, wherein the guard ribs are integrally formed with the housing.

11. The razor cartridge of claim 1, wherein the guard rib slots between adjacent ones of the guard ribs define a width in a range 1.0-2.0 mm.

12. The razor cartridge of claim 11, wherein the guard rib slots between adjacent ones of the guard ribs define the width as 1.5 mm.

13. The razor cartridge of claim 1, wherein the partition comprises a plurality of spaced apart partition ribs, defining partition rib slots between adjacent partition ribs, the partition ribs being arranged to extend in a direction parallel to the guard ribs.

14. The razor cartridge of claim 13, wherein the partition rib slots define a width in a range 0.4-1.0 mm.

15. The razor cartridge of claim 1, wherein the guard rib length dimension is in a range of about 5.4 mm and about 8.6 mm.

16. The razor cartridge of claim 1, wherein the pivot axis is laterally positioned within a width of the partition.

17. A razor cartridge, comprising:

an elongated housing having:

a guard at a front region of the housing, the guard including a plurality of spaced-apart guard ribs defining guard rib slots between adjacent ones of the guard ribs, the guard ribs extending from a floor of the guard, the guard rib slots extending along the floor;

a rear region of the housing including a cap;

a side wall at each elongated end region of the housing connecting the front region and the rear region;

a pivotal connecting structure defining a pivot axis; and a first razor blade, a second razor blade, and a third razor blade; all of the razor blades having their respective cutting edges extending transversely of the guard ribs; and a first span having a first length between the cutting edge of the first razor blade and the cutting edge of the second razor blade;

a second span having a second length between the cutting edge of the second razor blade and the cutting edge of the third razor blade;

the pivot axis in a region between the cutting edge of the first razor blade and the cutting edge of the second razor blade;

wherein the guard ribs extend between the front region of the housing towards the rear region; and wherein the guard ribs define a guard rib length dimension between the front region to the rear region of the housing;

wherein the guard rib length dimension for each of the guard ribs is generally equal;

wherein the guard ribs are configured to be perpendicular to the pivot axis;

wherein the guard rib slots define a slot length dimension slot length dimension is greater than the first length of the first span;

wherein the guard rib length dimension is in a range of about 5.4 mm and about 8.6 mm; and wherein a height dimension of the ribs increases in a direction from the front region of the housing toward the first razor blade, the floor including an angled region extending in a direction opposite to a plane tangential to the cutting edges of the first and the second razor blade, the angled region is close to the first razor blade.

18. The razor cartridge of claim 17, wherein each of the guard rib length dimensions is equal.

19. The razor cartridge of claim 17, wherein the guard ribs are integrally formed with the housing.

* * * * *